US007856282B2

(12) United States Patent
Tabor (10) Patent No.: US 7,856,282 B2
(45) Date of Patent: Dec. 21, 2010

(54) HYDRAULIC SYSTEM WITH COORDINATED MULTIPLE AXIS CONTROL OF A MACHINE MEMBER

(75) Inventor: Keith A. Tabor, Richfield, WI (US)

(73) Assignee: INCOVA Technologies, Inc., Waukesha, WI (US)

( * ) Notice: Subject to any disclaimer, the term of this patent is extended or adjusted under 35 U.S.C. 154(b) by 1863 days.

(21) Appl. No.: 10/810,377

(22) Filed: Mar. 26, 2004

(65) Prior Publication Data
US 2005/0216105 A1 Sep. 29, 2005

(51) Int. Cl.
G05B 11/01 (2006.01)
G05B 11/32 (2006.01)
G05B 19/18 (2006.01)
G06F 19/00 (2006.01)
G06G 7/76 (2006.01)

(52) U.S. Cl. .......................... 700/63; 700/61; 700/69; 700/71; 700/189; 700/251; 701/50

(58) Field of Classification Search .................. 414/692, 414/694, 697, 699, 700, 706; 700/61, 63, 700/69, 71, 188, 251; 701/26, 50; 37/348
See application file for complete search history.

(56) References Cited

U.S. PATENT DOCUMENTS

| 4,332,517 | A | * | 6/1982 | Igarashi et al. ................. 701/50 |
| 4,722,044 | A | | 1/1988 | Heiser et al. |
| 4,791,549 | A | | 12/1988 | Heiser et al. |
| 4,910,662 | A | | 3/1990 | Heiser et al. |
| 4,964,779 | A | * | 10/1990 | Sagaser ........................ 414/708 |
| 4,964,780 | A | | 10/1990 | Karvonen |
| 5,201,177 | A | * | 4/1993 | Kim ............................. 60/426 |
| 5,218,895 | A | * | 6/1993 | Lukich et al. .................. 91/361 |
| 5,257,177 | A | | 10/1993 | Bach et al. |
| 5,424,623 | A | * | 6/1995 | Allen et al. ............. 318/568.18 |
| 6,032,093 | A | * | 2/2000 | Denbraber et al. ............ 701/50 |
| 6,374,147 | B1 | | 4/2002 | Rockwood |
| 6,374,153 | B1 | | 4/2002 | Brandt et al. |

(Continued)

FOREIGN PATENT DOCUMENTS

WO   WO 94/26988 A1   11/1994

OTHER PUBLICATIONS

Keith Williams, "Coordinated Boom Control System for Rough Terrain Forklifts", SAE Technical Papers Series, 1991, pp. 65-73, SAE International, Warrendale, Pennsylvania USA.

Primary Examiner—Albert DeCady
Assistant Examiner—Jennifer L Norton
(74) Attorney, Agent, or Firm—Quarles & Brady LLP; George E. Haas (57) ABSTRACT

A member of a machine, such as a boom on construction equipment for example, is pivoted by a first actuator and has a length that is alterable by a second actuator. A control method allows an operator of the machine to command a point on the member to move along a straight line path. The operator command specifies velocities along two orthogonal axes and those velocities are transformed into an angular velocity and a length velocity for the member. The angular velocity and a length velocity then are converted into individual velocities for the first and second actuators. Each actuator is operated at its respective velocity to achieve the commanded movement of the member.

16 Claims, 4 Drawing Sheets

U.S. PATENT DOCUMENTS

| | | |
|---|---|---|
| 6,434,437 B1 | 8/2002 | Brandt et al. |
| 6,473,679 B1 * | 10/2002 | Tady et al. .................... 701/50 |
| 6,968,264 B2 * | 11/2005 | Cripps ......................... 701/50 |
| 7,093,383 B2 * | 8/2006 | Mennen et al. ................ 37/348 |
| 2007/0021895 A1 * | 1/2007 | Brandt et al. ................. 701/50 |

* cited by examiner

HYDRAULIC SYSTEM WITH COORDINATED MULTIPLE AXIS CONTROL OF A MACHINE MEMBER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic systems that control fluid flow to a plurality of hydraulic actuators which produce movement of a combination of mechanical components on a machine, and in particular to controlling hydraulic actuators for the pivot angle and length of a machine member, such as the boom on construction equipment.

2. Description of the Related Art

Construction and agricultural machines employ hydraulic systems to operate different mechanical elements. For example, a telehandler is a common material handling machine that has a pair of forks or a platform attached to the end of a telescopic boom pivotally coupled to a tractor. Separate hydraulic actuators are employed to change the pivot angle, i.e. raise and lower the boom, and change the length of the boom, with each of those operations being referred to as a "function" of the machine. The term "hydraulic actuator", as used herein, generically refers to any device, such as a cylinder or a motor, that converts hydraulic fluid flow into mechanical motion.

Heretofore, the machine operator controlled each function independently by manipulating the handles of different control levers. Each control lever operated a valve that governed the flow of pressurized fluid from a pump to the associated cylinder and the return flow of fluid to a tank that supplied the pump. Traditionally the control lever was mechanically linked to the valve, however there is a present trend away from mechanically operated hydraulic valves toward electrical controls using solenoid operated valves. Electrical control systems enable the valves to be located remotely from the operator cab, such as on the cylinder being controlled, for example. This simplifies the hydraulic plumbing on the machine, as a single pair of supply and tank return lines can be run in common to all the hydraulic actuators on a boom.

The operator often has to manipulate several control levers simultaneously in order to perform a given machine operation. In the case of a telehandler for example, both the boom elevation, or pivot, angle and its length must change to move the forks or platform horizontally. These simultaneous, coordinated maneuvers can be difficult to perform, especially by inexperienced operators.

Therefore, it is desirable to enable manipulation of a single control lever to control complex machine motion that involves the simultaneous, coordinated operation of a plurality of machine functions.

SUMMARY OF THE INVENTION

A member is mounted on a machine at a pivot angle that is alterable by a first actuator and the member has a length that is alterable by a second actuator. A control system is provided to operate the first and second actuators to move the member. That control system receives a command from an operator input device, which designates a desired velocity at which the point on the member is to move along a substantially straight line path.

The command is transformed into a desired angular velocity and a desired length velocity for the member. The desired angular velocity for the member then is converted into a desired first velocity and the first actuator is operated in response to the desired first velocity to alter the angle of the member.

The second actuator is operated based on the desired length velocity to alter the length of the member. In a selected application of the method practiced by the control system, the desired length velocity for the member is converted into a second velocity for the second actuator and operation of the second actuator is based on the second velocity.

One exemplary embodiment of that control method involves producing a first signal indicating the actual pivot angle of the member and producing a second signal denoting the actual length of the member. The actual angular velocity of the member is derived from the first signal and the actual length velocity of the member is derived from the second signal. A first error value, corresponding to a difference between the actual angular velocity and the desired angular velocity, is generated along with a second error value corresponding to a difference between the actual length velocity and the desired length velocity. The desired angular velocity is adjusted in response to the first error value to produce a corrected desired angular velocity which is employed in operating the first actuator. The desired length velocity is adjusted in response to the second error value to produce a corrected desired length velocity which is employed in operating the second actuator. In the preferred embodiment separate proportional-integral-derivative control functions are use to generate the two error values.

DETAILED DESCRIPTION OF THE INVENTION

Figure 1:
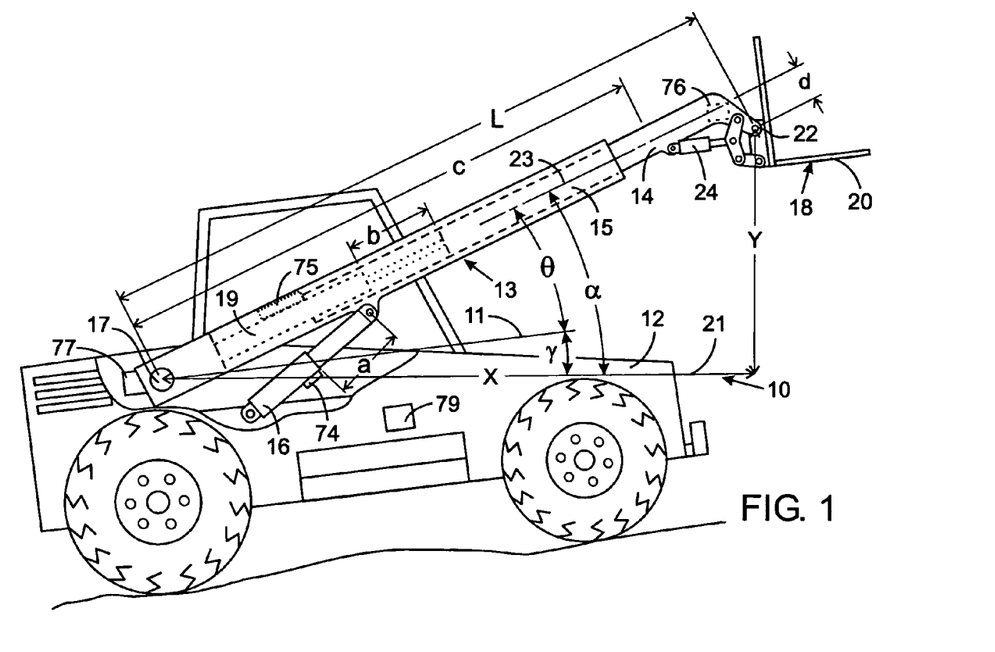
FIG. 1 is a partially cut-away, side view of a telehandler incorporating a hydraulic control system according to the present invention.

With initial reference to FIG. 1, the coordinated multiple axis control system, according to the present invention, is incorporated on a telehandler 10 that comprises a tractor 12 on which a boom 13 is pivotally mounted. However, this control system can be used on other types of hydraulically operated equipment. A first hydraulic actuator, such as a lift cylinder 16, raises and lowers the boom 13 in an arc about a pivot shaft 17, thereby varying the lift angle θ of the boom with respect to a base line 11 or plane that is fixed relative to the tractor 12. As the tractor moves on the earth the angle γ of that base line 11 with respect to a true horizontal line 21 varies. The sum of the angles θ and γ is an angle α that denotes the position of the boom 13 with respect to earth horizontal.

The boom 13 comprises first and second sections 14 and 15 that can be extended and retracted telescopically in response to operation of another hydraulic actuator, such as a length cylinder 19 within the boom. The telescopic action changes the overall length L of the boom. The length cylinder 19 is directly connected to the first and second boom sections 14 and 15, in which case the distance "b" that the rod extends from the cylinder body equals the length that the boom extends. In an alternative configuration, the length cylinder 19 is connected to the first section 14 by a block and tackle that provides a mechanical advantage, in which case the cylinder extension distance "b" is related by a mechanical gain to the length L of the boom. Although the first section 14 of the boom 13 slides into the second section 15, a similar telescopic action to vary the boom length can be implemented by the first section sliding along the exterior of the second section.

A workhead 18, such as a pair of pallet forks 20 or a platform for lifting items, is attached at pivot point 22 to the remote end of the first boom section 14. Other types of workheads may be attached to the remote end of the first boom section. A third hydraulic cylinder 24 rotates the workhead 18 vertically at the end of the boom 13. Extension of a piston rod from the third hydraulic cylinder 24 tilts the tips of the pallet forks 20 upward, and retraction of that piston rod lowers the fork tips.

Figure 2:
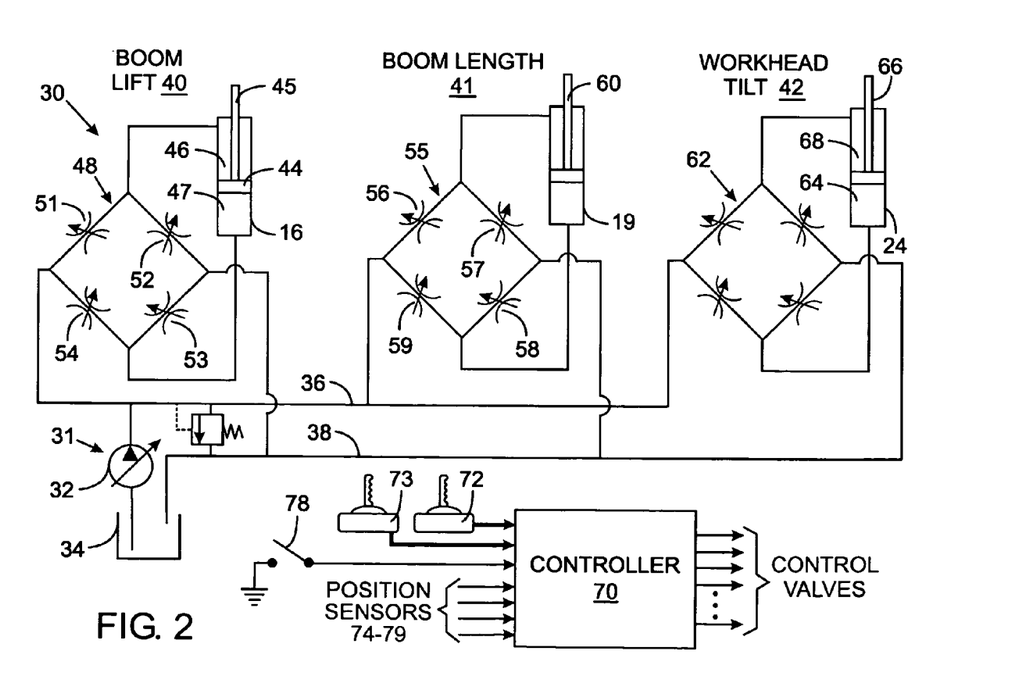
FIG. 2 is a schematic diagram of the hydraulic system for the telehandler.

With reference to FIG. 2, the hydraulic system 30 of the telehandler 10 has a fluid source 31, which comprises a pump 32 and a tank 34. The pump 32 draws hydraulic fluid from the tank 34 and forces the fluid under pressure into a supply line 36. After being used to power an actuator of the telehandler, the fluid flows back to the tank 34 through a return line 38.

The hydraulic system 30 controls three separate machine functions 40, 41 and 42 which respectively change the boom lift angle θ, the boom length L, and workhead tilt. The boom lift function 40 pivots the boom 13 with respect to the tractor 12 by operating the lift cylinder 16 that includes a piston 44 to which a rod 45 is connected. The piston 44 divides the lift cylinder 16 into a rod chamber 46 and a head chamber 47. A first valve assembly 48, comprising four proportional electrohydraulic valves 51, 52, 53 and 54, couples the rod and head chambers 46 and 47 to the supply and return lines 36 and 38 in a conventional manner. Each electrohydraulic valve 51-54 may be pilot operated by a solenoid, such as the valve described in U.S. Pat. No. 6,328,275, for example. The magnitude of electric current applied to a particular valve 51-54 determines the degree to which that valve opens and thus the flow rate of hydraulic fluid through the valve. By selectively operating the valves in opposite legs of the first valve assembly 48, hydraulic fluid can be applied to one cylinder chamber 46 or 47 and drained from the other chamber 47 or 46. In particular, opening valves 51 and 53 supplies pressurized hydraulic fluid from the supply line 36 to the rod chamber 46 to retract the first piston rod 45 into the lift cylinder 16, thereby lowering the boom 13 toward the tractor 12. Similarly, opening valves 52 and 54 supplies pressurized fluid to the head chamber 47 to extend the piston rod 45 from the lift cylinder 16 and raise the boom 13. It should be understood that the present invention can be used with hydraulic circuits having other types of electrohydraulic valve assemblies.

The boom length function 41 has a hydraulic circuit similar to that of the boom lift function 40 and includes a second assembly 55 of four proportional electrohydraulic valves 56, 57, 58 and 59 that control the flow of fluid to and from chambers of the length cylinder 19. Selective application of that fluid either extends the second piston rod 60 from the length cylinder 19, thereby extending the first section 14 from the second boom section 15, or retracts the second piston rod 60 into the length cylinder 19 which retracts the first section 14 into the second boom section 15.

The workhead tilt function 42 has a third valve assembly 62 with four proportional electrohydraulic valves that control the flow of fluid to and from chambers of the third cylinder 24. Sending fluid from the supply line 36 into the head chamber 64 of the third cylinder 24 extends the third piston rod 66 which tilts the forks of the workhead 18 upward, or counterclockwise in FIG. 1. Similarly applying supply line fluid to the rod chamber 68 of the third cylinder 24 retracts the third piston rod 66, thereby tilting the workhead forks 20 downward, or clockwise in FIG. 1. Various control techniques have been developed to maintain the forks or platform of the workhead 18 at a fixed angular orientation with respect to the tractor chassis as the boom is raised and lowered. Such control techniques are distinct from the present invention, however, one preferably is incorporated into the telehandler 10.

The four valves in assemblies 48, 55 and 62 are operated individually by a microcomputer based controller 70 that receives signals from manual input devices, such as a pair of joysticks 72 and 73 located in the cab of the telehandler 10. The telehandler operator manipulates the first joystick 72 about two orthogonal axes, designated M and N, to indicate the desired movement of the boom 13. In a conventional polar coordinate mode of operation, the first joystick 72 is moved from the centered position about one axis M to raise or lower the boom 13 by changing the lift angle θ. Movement of the first joystick 72 about the other axis N extends or retracts the first boom section 14 changing the boom length L. Both the boom lift angle and length can be changed simultaneously by moving the first joystick 72 about both axes at the same time. The first joystick 72 produces a pair of electrical signals, indicating its position about the two axes. The controller 70 responds to one of these electrical signals by selectively operating the first valve assembly 48 to apply hydraulic fluid to the lift cylinder 16, thereby producing the desired angular boom motion. The other joystick signal causes the controller 70 to operate the second valve assembly 55 to change the length L of the boom 13. The second joystick 73 is employed to tilt the workhead 18 with respect to the end of the boom.

The controller 70 also receives input signals from a plurality of sensors 74, 75, 76 and 79 in FIG. 1. A lift sensor 74 produces an electrical signal indicating the first extension distance "a" that the rod projects from the lift cylinder 16 and thus indicates the amount that the boom 13 is raised from the tractor 12. The rod extension distance is trigonometrically related to the boom lift angle θ. Alternatively the lift angle θ can be measured directly by a lift angle sensor 77 mounted between the boom 13 and the tractor 12. A pitch sensor 79 provides an electrical signal that indicates the pitch angle γ of the tractor 12, i.e. the angle between the tractor reference line 11 and true earth horizontal. A boom extension sensor 75 indicates the extension distance "b" that the first section 14 projects from the second boom section 15 and thus indicates the full boom length L, which is the sum of the extension distance "b" and the minimum length "c" of the two boom sections 14 and 15. The boom extension sensor 75 senses the distance that the rod extends from the length cylinder 19 which distance is the same as the amount that the first section 14 is extended from the second boom section 15 beyond the fully retracted position. Alternatively, the boom extension sensor 75 can be attached to the boom sections 14 and 15 to measure that extension amount directly. A workhead sensor 76 may be provided to produce an electrical signal indicating the tilt angle of the forks 20 with respect to the end of the first boom section 14. Some telehandlers have booms with three or more sections that extend in a telescopic fashion in which case the boom extension sensor 75 has to be configured to sense the overall length of the plurality of boom sections.

In addition to operating in the conventional polar coordinate mode, the telehandler 10 can be operated in an orthogonal coordinate mode in which the first joystick 72 designates desired movement of the remote end of the boom 13 in two orthogonal axes X and Y. The X axis corresponds to a horizontal line with respect to the earth and the Y axis corresponds to a vertical line. With continuing reference to FIGS. 1 and 2, a mode switch 78 is used by the machine operator to select either the polar or orthogonal coordinate mode. In the orthogonal coordinate mode of operation, movement of the first joystick 72 along one axis designates a desired velocity of the boom pivot point 22 along the X axis, while motion along the other joystick axis designates desired boom pivot point velocity along the Y axis. From the orthogonal velocity signals and the position sensor signals, the controller 70 derives signals to operate the first and second valve assemblies 48 and 55 so that the lift and length cylinders 16 and 19 produce the desired boom motion. The orthogonal mode of operation simplifies operator control of the workhead motion either horizontally or vertically with respect to the earth.

Figure 3:
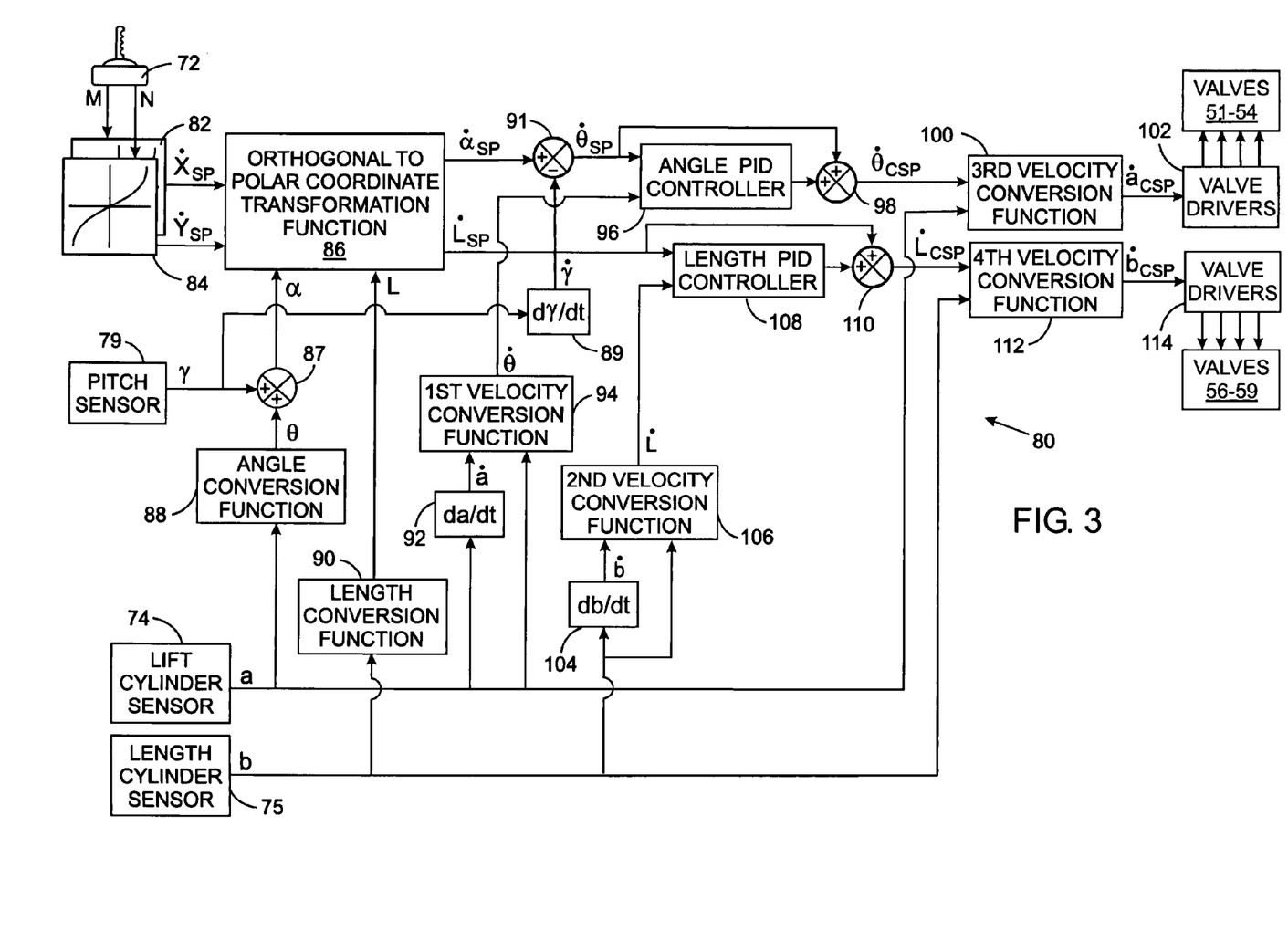
FIG. 3 is a control diagram depicting a first embodiment of a coordinated multiple axis boom control system of the telehandler.

Derivation of the signals to operate the first and second valve assemblies 48 and 55 is performed by a boom control system implemented in the software that the controller executes. A first embodiment 80 of that boom control system is depicted in FIG. 3. The first joystick 72 produces two signals M and N in response to motion of the joystick lever about its two axes. The M signal indicates the position of the joystick handle about one axis and the other signal N indicates the position of the joystick about the other axis. Those positions correspond to the desired velocities of the workhead 18 in the X and Y directions, respectively. The joystick signals M and N are applied to separate mapping routines 82 and 84 which convert the joystick position signals into signals indicating the desired velocities $\dot{X}_{SP}$ and $\dot{Y}_{SP}$ along the X and Y axes. The desired velocities also are referred to as velocity setpoints, hence the subscript SP.

In order to control the lift and extension cylinders 16 and 19, the desired orthogonal velocities $\dot{X}_{SP}$ and $\dot{Y}_{SP}$ have to be converted into cylinder velocities. This is accomplished by first converting the desired orthogonal velocities into desired polar coordinate velocities $\dot{\alpha}_{SP}$ and $\dot{L}_{SP}$. As stated previously the polar coordinate angle $\alpha$ is the sum of angles $\theta$ and $\gamma$. The conversion is based on the relationship between the orthogonal coordinate position X, Y of the workhead pivot point 22 and its polar coordinate position which is given by the expression:

$$(X,Y)=(L\cos(\theta+\gamma)+d\sin(\theta+\gamma), L\sin(\theta+\gamma)-d\cos(\theta+\gamma)) \quad (1)$$

where, as shown in FIG. 1, L is the total length of the boom 13, $\theta$ is the angular position of the boom, and $\gamma$ is the pitch angle of the tractor 12. However, the workhead pivot point 22 does not lie on the boom's longitudinal axis 23 which passes through the pivot shaft 17, but is offset by the distance "d". For some applications, the orthogonal motion needs to be referenced only to the machine and not to earth, in which case the pitch angle $\gamma$ drops out of expression (1) and the subsequent expressions herein.

From expression (1), the velocity $\dot{X}$ along the X axis is given by:

$$\dot{X}=\cos(\theta+\gamma)\dot{L}+(-L\sin(\theta+\gamma)+d\cos(\theta+\gamma))(\dot{\theta}+\dot{\gamma}) \quad (2).$$

Similarly the velocity along the Y axis is given by the expression:

$$\dot{Y}=\sin(\theta+\gamma)\dot{L}+(L\cos(\theta+\gamma)+d\sin(\theta+\gamma))(\dot{\theta}+\dot{\gamma}) \quad (3).$$

In view of expressions (2) and (3), the velocity relationships between the orthogonal and polar coordinate systems can be expressed by the matrix equation:

$$O = \quad\quad B \quad\quad P \quad (4)$$
$$\begin{bmatrix} \dot{X} \\ \dot{Y} \end{bmatrix} = \begin{bmatrix} -L\sin(\theta+\gamma)+d\cos(\theta+\gamma), & \cos(\theta+\gamma) \\ L\cos(\theta+\gamma)+d\sin(\theta+\gamma), & \sin(\theta+\gamma) \end{bmatrix} \begin{bmatrix} \dot{\theta}+\dot{\gamma} \\ \dot{L} \end{bmatrix}.$$

The transformation matrix B defines the relationship between the orthogonal coordinates of matrix O and the polar coordinates of matrix P. The inverse relationship, which specifies the polar coordinates in terms of the orthogonal coordinates, is given by the matrix equation:

$$P=B^{-1}O \quad (5)$$

where $B^{-1}$ is the inverse matrix of the transformation matrix B in equation (4). This latter relationship can be employed to transform the desired orthogonal velocities $\dot{X}_{SP}$ and $\dot{Y}_{SP}$ into the desired polar coordinate system velocities $\dot{\alpha}_{SP}$ and $\dot{L}_{SP}$.

Referring again to FIG. 3, the desired orthogonal velocities $\dot{X}_{SP}$ and $\dot{Y}_{SP}$ from mapping routines 82 and 84 are applied to an orthogonal coordinate to polar coordinate transformation function 86 which solves equation (5) using the inverse transformation matrix $B^{-1}$. The coordinate transformation function 86 also receives signals designating the actual polar coordinate positions $\alpha$ and L of the workhead pivot point 22 at the end of the boom 13. Those actual polar coordinate positions are derived from the lift cylinder sensor 74, which produces a signal designating the distance "a" that its rod is extended and from the boom extension sensor 75, which provides a signal indicating the distance "b" that the first boom section 14 is extended from the second section 15. The lift cylinder distance "a" is applied to an angle conversion function 88 that transforms that distance into the corresponding lift angle $\theta$, which is summed at node 87 with the pitch angle $\gamma$ to produce the first polar coordinate $\alpha$. The length cylinder distance "b" is applied to a length conversion function 90 that transforms that distance into the length polar coordinate L. These two cylinder extension distances "a" and "b" are applied to separate conversion functions 88 and 90 which respectively produce the corresponding polar coordinates $\theta$ and L for the position of the workhead pivot point 22.

Although these conversion functions 88 and 90 may be implemented in the realm of digital computers using look-up tables stored in the controller's memory, alternatively each conversion can be performed by solving an equation that relates the cylinder extension distance "a" and "b" to the respective polar coordinates $\theta$ and L. For example the boom length L can be derived by adding the sensed cylinder extension distance "b" to the minimum, or fully retracted, length "c" of the boom 13. Because there is a fixed arithmetic sum relationship between the boom cylinder extension distance "b" and the boom length L, as a further alternative that relationship may be incorporated into the coordinate transformation function 86 which then would directly receive the boom cylinder extension distance "b" as an input, eliminating the length conversion function 90.

The final variable required by the coordinate transformation function 86 is the offset distance "d" of the workhead pivot point 22 from the longitudinal axis 23 of the boom. That offset distance is constant for a particular machine and thus, does not have to be derived and inputted, but is incorporated into the function 86. The results of the coordinate transformation are the desired polar coordinate velocities $\dot{\alpha}_{SP}$ and $\dot{L}_{SP}$.

The angular coordinate velocity $\dot{\alpha}_{SP}$ then is transformed into a desired angular velocity $\dot{\theta}_{SP}$ for the motion of the boom relating to the tractor 12. This is accomplished by deriving the pitch velocity $\dot{\gamma}$ of the tractor 12 from the pitch sensor signal using a differentiator 89. The pitch velocity then is subtracted from the angular coordinate velocity $\dot{\alpha}_{SP}$ at summing node 91 to produce the desired boom angular velocity $\dot{\theta}_{SP}$.

The resultant desired polar coordinate boom velocities $\dot{\theta}_{SP}$ and $\dot{L}_{SP}$ are compared to actual polar coordinate boom velocities $\dot{\theta}$ and $\dot{L}$ which are produced by differentiating the position signals from the two cylinder sensors 74 and 75. Specifically, the signal from the lift cylinder sensor 74, indicating extension distance "a", is applied to a first derivative function 92 or a differentiator that produces a signal denoting the lift cylinder velocity $\dot{a}$ at which the length of that hydraulic actuator is changing. The lift cylinder velocity $\dot{a}$ and extension distance "a" are applied to a first velocity conversion function 94, which is another look-up table for example, that converts the linear velocity of the lift cylinder into the angular velocity $\dot{\theta}$ of the boom 13.

The actual boom angular velocity $\dot{\theta}$ and the corresponding desired angular velocity $\dot{\theta}_{SP}$ are compared in an angle PID controller 96 which executes a conventional proportional-integral-derivative control function that produces an output indicating a correction value based on the actual and desired angular velocities. This correction value is then combined with the desired angular velocity $\dot{\theta}_{SP}$ at a first summation node 98 to produce a corrected desired angular velocity $\dot{\theta}_{CSP}$. A third velocity conversion function 100, implemented by another look-up table, transforms the corrected desired angular velocity $\dot{\theta}_{CSP}$ into a corrected desired lift cylinder velocity $\dot{a}_{CSP}$ at which the lift cylinder 16 must move to produce that corrected desired angular velocity of the boom 13. That corrected desired lift cylinder velocity $\dot{a}_{CSP}$ is applied to a conventional first set of valve drivers 102 which produce the current levels necessary to open selected valves within the first assembly 48 (FIG. 2) in order to achieve this desired velocity of the lift cylinder 16 and of the boom. One type of such valve drivers is described in U.S. patent application Ser. No. 10/254,128.

A similar control function occurs with respect to changing the length of the boom 13 in order to accomplish the commanded vertical or horizontal motion. For this function, a signal from the boom extension sensor 75, which indicates the actual distance "b" that the rod extends from the cylinder body, is applied to a second derivative function 104 or a differentiator to produce a value representing the velocity $\dot{b}$ at which the boom length cylinder is changing. In the configuration of the boom 13 shown in FIG. 1, the length cylinder 19 is directly connected to the first and second boom sections 14 and 15 and the boom length cylinder velocity $\dot{b}$ equals the velocity $\dot{L}$ at which the length of the boom 13 is changing. Alternatively where the length cylinder 19 is connected to the first section 14 by mechanism that provides a mechanical advantage, boom length velocity $\dot{L}$ is related to the length cylinder velocity $\dot{b}$ by the mechanical gain of that mechanism. In this latter case, the length cylinder velocity $\dot{b}$ produced by the second derivative function 104 is converted to the boom length velocity $\dot{L}$ by a second velocity conversion function 106.

The resultant boom length velocity $\dot{L}$ is applied to a length PID controller 108 along with the desired boom length velocity $\dot{L}_{SP}$. The length PID controller 108 compares these two input values to derive a correction value based upon a difference between the desired and actual boom length velocities. This correction value is combined with the desired length velocity $\dot{L}_{SP}$ at a second summation node 110 to produce a corrected desired boom length velocity $\dot{L}_{CSP}$.

For a machine in which the length cylinder 19 is directly connected to the first and second boom sections 14 and 15, the corrected boom length velocity $\dot{L}_{CSP}$ equals the desired velocity $\dot{b}_{CSP}$ for the length cylinder 19. In which case the output from the length PID controller 108 can be applied directly to the second set of valve drivers 114 for the second valve assembly 55 that controls the boom length cylinder 19. In other machines in which the length cylinder 19 is connected to the first boom section 14 by mechanism that provides a mechanical gain, a fourth velocity conversion function 112, in the form of yet another look-up table, transforms the corrected desired boom length velocity $\dot{L}_{CSP}$ into the desired velocity $\dot{b}_{CSP}$ for the length cylinder 19. The desired length cylinder velocity $\dot{b}_{CSP}$ then is applied to the second set of valve drivers 114.

Thus the machine operator manipulates the first joystick 72 to designate desired motion of the pivot point 22 for the workhead 18 in an orthogonal coordinate system. This enables the operator, by moving the first joystick 72 along only one axis, to command horizontal or vertical workhead motion. The boom control system 80 initially transforms the commanded horizontal or vertical motion into the polar coordinate motion, conventionally employed to control the boom lift angle and length. Then the boom control system translates the polar coordinate motion into corresponding velocities for the hydraulic actuators that produce angular and telescopic movement of the boom 13. Those resultant hydraulic actuator velocities finally are converted into electrical signals for operating the respective valves to drive the hydraulic actuator to achieve the desired boom movement.

Figure 4:
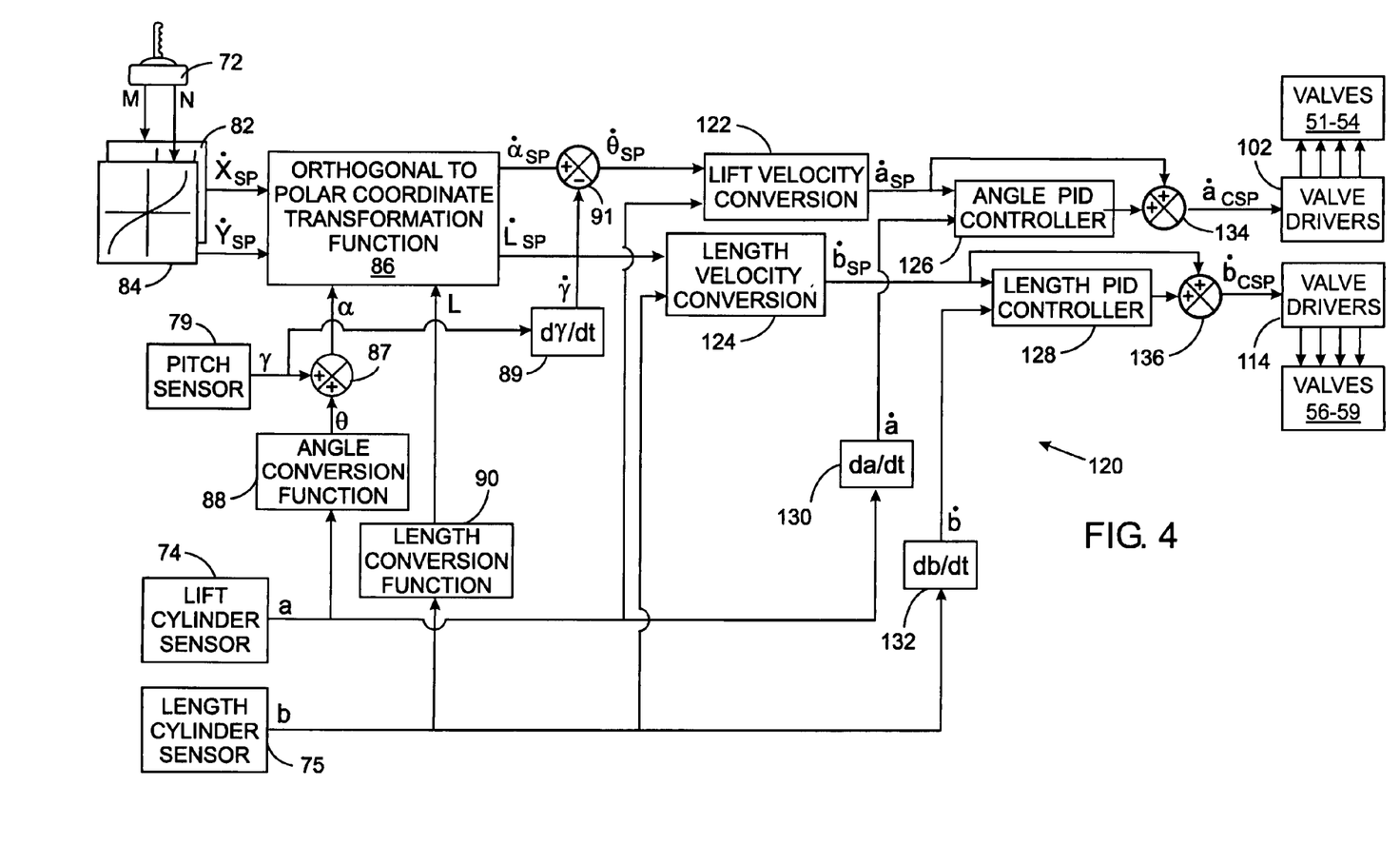
FIG. 4 is a control diagram representing a second embodiment of the boom control system.

FIG. 4 depicts a second boom control system 120 in which elements that are in common with the first boom control system 80 have been assigned identical reference numerals. For example, identical components are employed to convert the signals from the first joystick 72 into desired velocities ($\dot{\theta}_{SP}$ and $\dot{L}_{SP}$) for the boom lift angle and length. However in the second boom control system 120, those desired velocities are applied to inputs of two velocity conversion functions 122 and 124, respectively. These velocity conversion functions 122 and 124 are implemented by look-up tables that also are addressed with the lift and length cylinder extension distances "a" and "b" measured by the respective sensors 74 and 75. The lift and length velocity conversion functions 122 and 124 translate the desired polar coordinate boom velocities $\dot{\theta}_{SP}$ and $\dot{L}_{SP}$ into the desired velocities $\dot{a}_{SP}$ and $\dot{b}_{SP}$ for the lift cylinder 16 and length cylinder 19, respectively.

Those desired cylinder velocities $\dot{a}_{SP}$ and $\dot{b}_{SP}$ are applied to separate angle and length PID controllers 126 and 128 along with the actual cylinder velocities $\dot{a}$ and $\dot{b}$ from derivative functions 130 and 132, or differentiators. The angle PID controller 126 produces an angle velocity correction value that is combined with the desired lift cylinder velocity $\dot{a}_{SP}$ at a first summation node 134. This summation creates a corrected lift cylinder velocity $\dot{a}_{CSP}$ which is applied to the first set of valve drivers 102 for the four lift cylinder valves 51-54 in assembly 48. The length PID controller 128 produces a correction value based on the difference between the desired and actual velocities of the boom length cylinder 19. That correction value is combined at a second summation node 136 with the desired velocity $\dot{b}_{SP}$ for that cylinder to produce a corrected length cylinder velocity $\dot{b}_{CSP}$. This corrected velocity value is applied to the second set of valve drivers 114 that control the valves 56-59 in the second assembly 55 which operate the boom length cylinder 19.

Figure 5:
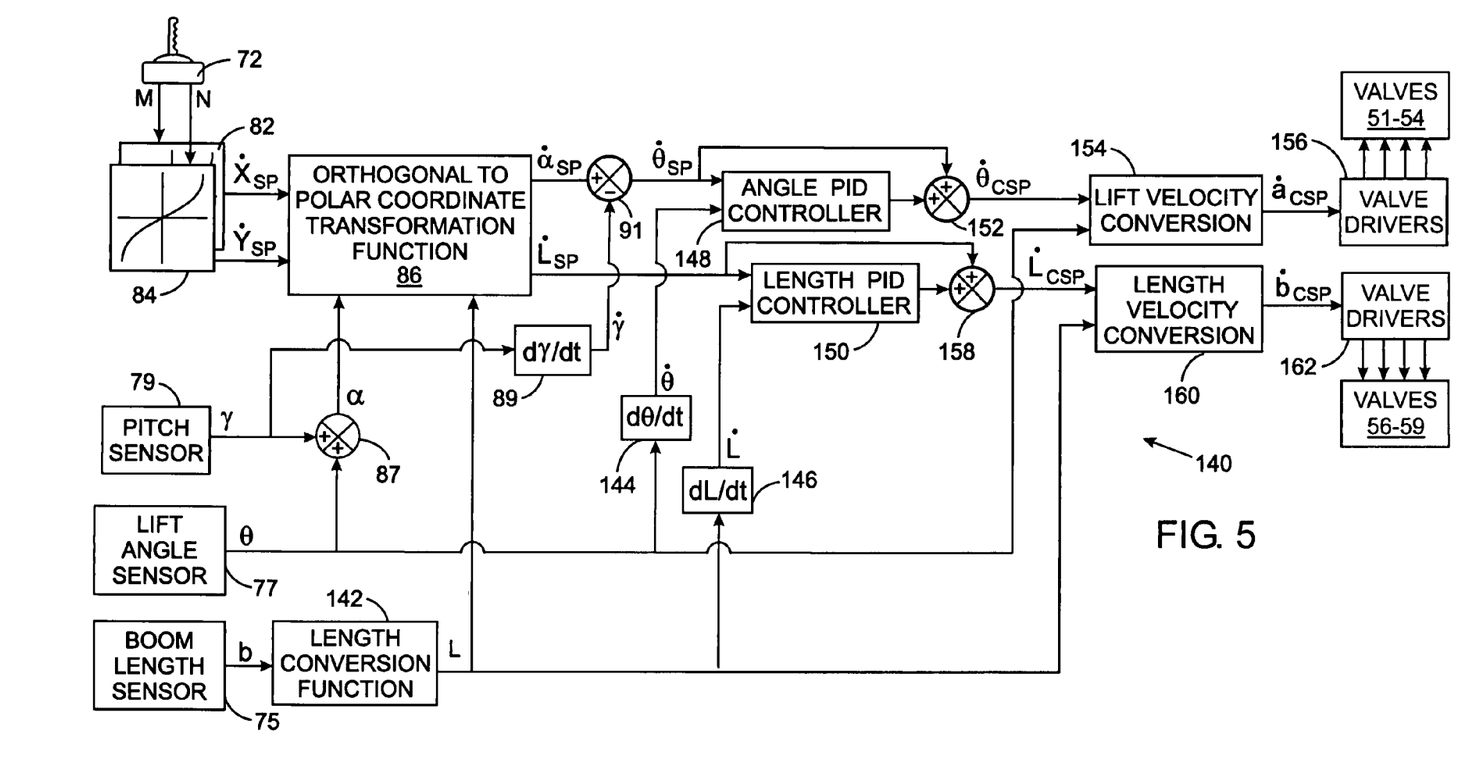
FIG. 5 is a control diagram illustrating a third embodiment of the boom control system.

The first and second boom control systems 80 and 120 in FIGS. 3 and 4 employ the outputs of the lift cylinder sensor 74 and the boom extension sensor 75 which indicate the distance that the rod of each cylinder is extended. In place of the lift cylinder sensor 74, an rotation sensor 77 can be employed to directly sense the lift angle θ between the tractor 12 and the boom 13. With reference to FIG. 5, a third version 140 of a boom control system uses that sensed lift angle θ in controlling the movement of the remote end of the boom, and particularly work head pivot point 22, for straight line motion. The output of the boom extension sensor 75, indicating the distance "b" that the boom length cylinder 19 is extended, is translated into the total boom length L by a length conversion function 142 than is identical to the length conversion function 90, described previously with respect the first control system 80 in FIG. 3.

The boom's angular position α and length L are applied to the orthogonal to polar coordinate transformation function 86 to translate the desired orthogonal velocities $\dot{X}_{SP}$ and $\dot{Y}_{SP}$ into desired polar coordinate velocities $\dot{\alpha}_{SP}$ and $\dot{L}_{SP}$. The polar coordinate velocities are supplied to angle and length PID controllers 148 and 150, which also receive the actual polar coordinate velocities $\dot{\theta}$ and $\dot{L}$ of the boom 13. Those actual velocities are derived from the actual boom positions θ and L by a pair of derivative functions 144 and 146 or a pair of differentiators.

The angle PID controller 148 produces an correction value corresponding to the difference between the desired and actual angular velocities $\dot{\theta}_{SP}$ and $\dot{\theta}$. That correction value is applied at a first summation node 152 to the desired angular velocity, thereby creating a corrected desired angular velocity $\dot{\theta}_{CSP}$. This latter velocity value is applied to a lift velocity conversion function 154 along with the actual angular position θ of the boom 13 to produce a desired lift cylinder velocity $\dot{a}_{CSP}$. This lift cylinder velocity is applied to the first set of valve drivers 156 which respond by operating selected valves 51-54 and assembly 48 to control the lift cylinder 16 and achieve the angular movement of the boom 13.

Similarly, the desired length velocity $\dot{L}_{SP}$ for the boom 13 and the actual length velocity $\dot{L}$ are applied to the length PID controller 150. The result is a correction value based on the difference between the desired and actual length velocities of the boom. That correction value is used by a second summation node 158 to generate a corrected desired length velocity $\dot{L}_{CSP}$ which is furnished to a length velocity conversion function 160 to produce a desired length velocity $\dot{b}_{CSP}$ for the boom length cylinder 19. That desired length velocity is applied to a second set of valve drivers 162 that control the valves 56-59 in the second valve assembly 55 to apply hydraulic fluid to the boom length cylinder 19, thereby achieving the desired length motion of the boom 13.

The foregoing description was primarily directed to preferred embodiments of the present invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for controlling movement of a member wherein an angle of the member with respect to a reference is alterable by a first actuator and a length of the member is alterable by a second actuator, the method comprises:

producing a command which designates a desired velocity that a point on the member is to travel along a desired substantially straight line path;

transforming the command into a desired angular velocity and a desired length velocity for the member, by utilizing the length of the member which is derived by sensing a dimension of the second actuator and converting that dimension into the length of the member;

converting the desired angular velocity for the member into a desired first velocity of the first actuator;

operating the first actuator in response to the desired first velocity to alter the angle of the member; and operating the second actuator based on the desired length velocity to alter the length of the member.

2. The method as recited in claim 1 wherein producing a command comprises designating a first desired velocity that the point on the member is to travel along a first axis.

3. A method for controlling movement of a member wherein an angle of the member with respect to a reference is alterable by a first actuator and a length of the member is alterable by a second actuator, the method comprises:

producing a command which designates a desired velocity that a point on the member is to travel along a desired substantially straight line path, wherein producing the command comprises:

(a) designating a first desired velocity that the point on the member is to travel along a first axis, and (b) designating a second desired velocity that the point on the member is to travel along a second axis that is orthogonal to the first axis;

transforming the command into a desired angular velocity and a desired length velocity for the member, wherein transforming the command utilizes the relationships defined by the equations:

$$\dot{X} = \cos(\theta+\gamma)\dot{L} + (-L\sin(\theta+\gamma) + d\cos(\theta+\gamma))(\dot{\theta}+\dot{\gamma})$$

$$\dot{Y} = \sin(\theta+\gamma)\dot{L} + (L\cos(\theta+\gamma) + d\sin(\theta+\gamma))(\dot{\theta}+\dot{\gamma})$$

where $\dot{X}$ is velocity of the point on the member along the first axis, $\dot{Y}$ is velocity of the point on the member along the second axis, θ is the angle of the member, $\dot{\theta}$ is the angular velocity of the member, γ is a pitch angle of a machine on which the member is mounted, $\dot{\gamma}$ is an angular pitch velocity of the machine, $\dot{L}$ is a rate at which the length of the member is changing, and d is a distance that the point is offset from a longitudinal axis of the member;

converting the desired angular velocity for the member into a desired first velocity of the first actuator;

operating the first actuator in response to the desired first velocity to alter the angle of the member; and operating the second actuator based on the desired length velocity to alter the length of the member.

4. The method as recited in claim 1 wherein transforming the command utilizes an angular position of the member which is derived by sensing a dimension of the first actuator and converting that position into the angular position of the member.

5. The method as recited in claim 1 further comprising converting the desired length velocity for the member into a second velocity of the second actuator, wherein operating the second actuator is in response to the second velocity.

6. A method for controlling movement of a member wherein an angle of the member with respect to a reference is alterable by a first actuator and a length of the member is alterable by a second actuator, the method comprises:

producing a command which designates a desired velocity that a point on the member is to travel along a desired substantially straight line path;

sensing a first parameter of the machine to produce a first signal denoting the angle of the member relative to a reference, wherein sensing a first parameter senses a dimension of the first actuator;

sensing a second parameter of the machine to produce a second signal denoting the length of the member;

deriving an actual angular velocity of the member from the first signal; and deriving an actual length velocity of the member from the second signal;

transforming the command into a desired angular velocity and a desired length velocity for the member;

converting the desired angular velocity for the member into a desired first velocity of the first actuator;

operating the first actuator in response to the desired first velocity to alter the angle of the member; and operating the second actuator based on the desired length velocity to alter the length of the member.

7. The method as recited in claim 6 further comprising:

generating a first error value corresponding to a difference between the actual angular velocity and the desired angular velocity;

generating a second error value corresponding to a difference between the actual length velocity and the desired length velocity;

adjusting the desired angular velocity in response to the first error value to produce a corrected desired angular velocity which is employed in operating the first actuator; and adjusting the desired length velocity in response to the second error value to produce a corrected desired length velocity which is employed in operating the second actuator.

8. The method as recited in claim 7 wherein generating a first error value and generating a second error value both utilize a proportional-integral-derivative control function.

9. The method as recited in claim 6 wherein sensing a first parameter senses the angle of the member relative to a reference.

10. The method as recited in claim 6 wherein sensing a second parameter of the machine senses a dimension of the second actuator.

11. The method as recited in claim 1 further comprising:

sensing a first parameter of the first actuator;

sensing a second parameter of the second actuator;

in response to the first parameter, deriving an actual velocity of the first actuator;

in response to the second parameter, deriving an actual velocity of the second actuator;

generating a first error value corresponding to a difference between the actual velocity of the first actuator and the desired first velocity;

generating a second error value corresponding to a difference between the actual velocity of the second actuator and the desired second velocity;

adjusting the desired first velocity in response to the first error value to produce a result which is used in operating the first actuator; and adjusting the desired second velocity in response to the second error value to produce another result which is used in operating the second actuator.

12. The method as recited in claim 11 wherein generating a first error value and generating a second error value both utilize a proportional-integral-derivative control function.

13. A method for controlling movement of a member, wherein an angle of the member with respect to a reference is alterable by a first actuator and the member has a first section that extends from a second section by an amount that is varied by a second actuator, the method comprises:

designating a first desired velocity that a point on the member is to travel along a first axis;

designating a second desired velocity that a point on the member is to travel along a second axis which is orthogonal to the first axis;

sensing a first parameter that indicates a position of the member;

deriving an angular position of the member from the first parameter;

sensing a second parameter that indicates an amount that the first section extends from the second section, wherein sensing a second parameter comprises sensing a dimension of the second actuator;

deriving a length of the member from the second parameter;

transforming the first and second desired velocities into a desired angular velocity and a desired length velocity for the member, wherein that transforming is based on the angular position and the length of the member;

converting the desired angular velocity for the member into a desired first velocity of the first actuator;

operating the first actuator in response to the desired first velocity to alter the angle of the member; and operating the second actuator based on the desired length velocity to alter the length of the member.

14. The method as recited in claim 13 wherein converting the desired angular velocity comprises:

deriving an actual angular velocity of the member from the first parameter;

generating first error value corresponding to a difference between the actual angular velocity and the desired angular velocity; and adjusting the desired angular velocity in response to the first error value to produce a corrected desired angular velocity which is employed in operating the first actuator.

15. The method as recited in claim 13 wherein operating the second actuator comprises converting the desired length velocity for the member into a desired second velocity for the second actuator.

16. The method as recited in claim 15 wherein converting the desired length velocity comprises:

deriving an actual length velocity of the member from the second parameter;

generating second error value corresponding to a difference between the actual length velocity and the desired length velocity; and adjusting the desired length velocity in response to the second error value to produce a corrected desired length velocity which is employed in operating the second actuator.

* * * * *